United States Patent [19]

Brandy et al.

[11] Patent Number: 5,318,279
[45] Date of Patent: Jun. 7, 1994

[54] RECEPTACLE FOR MOLTEN METALS, MATERIAL FOR THIS RECEPTACLE AND METHOD OF PRODUCING THE MATERIAL

[75] Inventors: Gilbert Brandy, Feignies; Jean-Claude Compagnon, Rimogne; Jean-Marie Vignot, Marieux, all of France

[73] Assignee: Vesuvius Crucible Company, Pittsburgh, Pa.

[21] Appl. No.: 42,836

[22] Filed: Apr. 5, 1993

Related U.S. Application Data

[63] Continuation of Ser. No. 663,846, Mar. 28, 1991, abandoned.

[30] Foreign Application Priority Data

Sep. 30, 1988 [FR] France .................. 88 12833

[51] Int. Cl.$^5$ .............................................. B22D 41/02
[52] U.S. Cl. ............................ 266/275; 266/286; 432/265
[58] Field of Search .............. 432/262, 264, 265; 266/275, 276, 280, 286, 283, 282; 501/95; 52/600

[56] References Cited

U.S. PATENT DOCUMENTS

| | | | |
|---|---|---|---|
| 122,908 | 1/1872 | Perry | 266/282 |
| 1,084,679 | 1/1914 | Webster | 432/262 |
| 1,381,171 | 6/1921 | Darrah | 432/265 |
| 1,624,386 | 4/1927 | Betts | 52/600 |
| 2,543,700 | 2/1951 | Leitten et al. | 432/262 |
| 4,208,214 | 6/1980 | Stein et al. | 501/95 |
| 4,764,488 | 8/1988 | Saito | 501/95 |

FOREIGN PATENT DOCUMENTS

| | | |
|---|---|---|
| 0171923 | 7/1985 | European Pat. Off. . |
| 2114620 | 8/1983 | United Kingdom . |
| 2182128 | 5/1987 | United Kingdom . |

Primary Examiner—Scott Kastler
Attorney, Agent, or Firm—Webb, Burden, Ziesenheim & Webb

[57] ABSTRACT

The invention concerns a composite material for a receptacle for transferring molten metal.

It is comprised of a refractory material and a frame chosen in the group comprised of mineral refractory wires and metallic wires.

Application to the foundry industry.

10 Claims, 2 Drawing Sheets

RECEPTACLE FOR MOLTEN METALS, MATERIAL FOR THIS RECEPTACLE AND METHOD OF PRODUCING THE MATERIAL

This a continuation of copending application Ser. no. 07/663,846 filed on Mar. 28, 1991 now abandoned.

The object of the present invention is a new material for receptacles for transferring molten metal.

A more particular object of it is a composite material for this application.

Most receptacles that are to contain molten metals are produced of metals more refractory than the metal that they are to contain; the metal constituting the receptacle material and the molten metal are frequently separated by refractory materials, whether by what is called lubricants or release agents in the trade, or in a more conventional manner by brickwork, or by any other means.

These tools are traditionally of cast iron or steel and are obtained either by molding or by stamping, and then prepared before use.

In this traditional concept, the nature of the constituting material induces an electrochemical erosion of the receptacle by the molten metal bath, which is manifested by a rapid wear of the tool and a contamination of the metal bath by iron.

The thermal conductivity of the traditional material induces a substantial heat loss during the furnace-mold transfer. The operation of applying a lubricant or release agent is designed to remedy these shortcomings, at least partially. It necessitates shutdowns in the production of molding installations and imposes a preheating of the removal tool before each resumption of production.

The attempt to minimize the heat losses during removal induces the foundryman to place the removal element, in the resting position, closer to the bath surface, to the detriment of the mechanical reliability of the dosing and transfer manipulator.

When the receptacles are not subject to substantial stresses, it is possible to produce receptacles of pure refractory ceramics; however, these refractory ceramics are generally quite fragile and can be used only for receptacles of low or medium capacity.

The problem is particularly acute when the transport of molten metal is involved, notably when the receptacle has to pass over worksites or anywhere that breakage of the receptacle would result in the dropping of molten metal that could be fatal or incapacitating for individuals, destructive for the work areas and materials, as well as the cause of fires.

Under these conditions, one must not take the slightest risk during molten metal transport operations. This transport is thus generally carried out by means of metal receptacles, whether treated with lubricant or release agent or not. By reason of the excellent thermal conductivity of the metal, an overheating of the molten metal should take place prior to transport so that it arrives at its destination still in the molten state and ready for use.

Such overheatings are not always possible. For example, some metals are volatile and an overheating would tend to cause an excessive liberation of the said metals into the air. There is thus a limiting temperature above which an overheating cannot be applied. There are other reasons why an overheating is not possible; notably, we cite the temperatures above which oxidation becomes too substantial or above which it is no longer possible to guarantee the quality of the metals or alloys cast.

Thus, for some metals and alloys, the difference in temperature between the upper limiting temperature and the utilization temperature of the alloy or molten metal is too slight to assure ready transport of the molten metal. It follows that the arrival temperature is frequently too low and too many pieces have to be rejected, notably in the case of molding.

This is why one of the goals of the present invention is to furnish a suitable material for receptacles that are to contain a molten metal, which is at the same time sufficiently strong so as not to be destroyed with the slightest shock and sufficiently low-conducting so as to avoid an excessive heat loss and chemically inert with respect to the metals transported.

Another goal of the present invention is a process for producing this material or receptacles of this material.

Another goal of the present invention is to furnish receptacles of this material.

These goals and others that will appear in the following are achieved by means of a composite material for a molten metal transfer receptacle, characterized in that it is comprised of a refractory material and of a frame chosen in the group comprised of refractory mineral wires and metal wires. The actualization of such a material necessitated considerable research and the development of a special production technique. The refractory material consists of the following elements and their mixtures: refractory earths, metal oxides or compounds of oxides, metal borides, metal carbides, metal nitrides, neoceramics, or silica.

The wires are advantageously arranged, preferably woven, to form a loose network.

The mesh size, i.e., the distance between two wires belonging either to the woof or the warp, is between ca. 5 and ca. 1000 times the diameter of the wires used.

The form of the mesh is unimportant and the network can be obtained by any means equivalent to weaving, e.g., by simple interlacing of the wires that would constitute the warp in the case of weaving in the strict sense.

The network can be simple or multiple; it is advantageously simple or double. The choice of wires is important and according to the present invention, there is an alternative for obtaining a material that can be readily produced and resists thermal shocks and the stresses induced by temperature variations.

One of the terms of this alternative is the choice of one or more mineral refractory materials as the material constituting the wires. They can be comprised of short or long fibers whose diameter is between ca. 0.001 mm and ca. 0.5 mm, preferably between 0.001 and ca. 0.02 mm. The diameter of the wires is itself preferably between ca. 1/20mm and ca. 5 mm.

When the wires are of mineral refractories, the values given above for the mesh size are located at the top of the range and in these cases a particularly satisfactory distance between two opposing wires in the mesh is between ca. 2 and ca. 20 mm.

The material making up the wires can be carbon or sialons, but according to a preferred mode of the present invention, the wires are of silicon carbide, such as those sold under the filed trademark "Nicalon".

According to the other term of the alternative, the said wires are metal wires. The material constituting the wires is advantageously chosen in the group composed of metals and alloy, preferably ferrous.

These latter advantageously have a diameter between ca. 0.1 and 1 mm, preferably between ca. 0.3 and ca. 0.6 mm; if necessary, the wires can be comprised of strands.

When metal wires are used, it is in the low part of the range specified above and relative to the mesh size. The unit cells have a dimension preferably between ca. 5 and ca. 30 times the diameter of the wire. Advantageously, the said refractory material contains at least 30% by volume of vitreous fused silica, preferably at least 50%. Charge elements and binders are added to make up the 100%.

With regard to the charge, it can be selected among the various classic adjuvants: refractory earths, metal oxides or oxide compounds, metal borides, metal carbides, metal nitrides, neoceramics and silica derivatives. Among the metal oxides, refractory oxides and oxides compounds are involved, more particularly, the oxides of transition metals and elements of columns 3 and 4a of the periodic table of elements.

The most suitable carbides are silicon, titanium and tungsten carbides, the most suitable nitrides are titanium, tungsten, boron and silicon nitrides, sialons and oxynitrides of silicon, the most suitable borides are titanium borides. The neoceramics that can be cited are those obtained by the thermal decomposition of carbosilanes.

One of the advantages of the present invention is the possibility of modulating the thermal conductivity by regulating the size and composition of the charge. The thermal conductivity can thus be readily varied between a value from $\frac{1}{8}$W/m.°C. to 10 W/m.°C. Under the conditions that will be specified hereafter where metal wires are used, the materials, receptacles and more particularly the ladles for transport of the molten metal can be produced according to a production method involving the following stages:

(a) shaping by a technique chosen in the group of molding and casting techniques,
(b) optionally, conditioning of the shaped object,
(c) baking up to sintering, the said wires being incorporated into the object or the material during the shaping stage (a).

The shaping stage (a) can be carried out in any manner familiar in itself, but it is advantageously carried out in the manner by which the materials and the foundry molds, the objects of an application filed the same day, are produced.

This application concerns a process that seeks to produce objects in which the ratio between maximum and minimum thicknesses of the piece is greater than ca. 1.5 and in which the techniques used involve a mixture containing 2%–20% water by weight. This mixture is composed of a slip of vitreous fused silica, granular vitreous silica, the charge of adjuvants and possibly binder. The said slip also contains viscosity agents for bringing the viscosity of the mixture to a value between 0.1 Pa.s and ca. 50 Pa.s.

The shaping technique conditions the viscosity and the water content of the said slip and, to a lesser degree, the granulometry of the vitreous fixed silica. The granulometry and viscosity should be selected so that the sedimentation rate of an average particle is less than 200, preferably 100 mm/h. When a casting technique is used, a reservoir should be provided for the mold to compensate for the shrinkage, which generally is 10%. For this casting technique, a slip containing 16–20% Water is preferably used. This mixture is cast in a mold of plaster of Paris according to techniques known in themselves. During drying in the plaster mold, shrinkage is compensated by the mixture reserve.

For other techniques, i.e., pressing, injection, vibrocompacting or vibrocasting, mixtures having a high viscosity of the order of 1–20 Pa.s, preferably in the vicinity of 10 Pa.s, are used.

In these cases also, mixtures having a much lower percentage of water are used, since they generally contain only 2%–10% water by weight.

Once the mixture is shaped, cohesion of the piece is obtained by natural aging, drying, polymerization or by baking. These means can be used separately or in combination.

In some very difficult cases, modification of the shape of the pieces and improvement of the surface state can be envisioned after cohesion is obtained. The dimensional tolerance in this case is of the order of 1/10 mm. Diamond tools should preferably be used for this with, by means of example, milling cutters 2–10 mm in diameter, turning at speeds greater than 10,000 r.p.m. and having a rate of advance of 2/10–1 mm/min; the amounts removed are of the order of 10 mm$^3$/min.

When metal wires are used, a special procedure can be employed to resolve the problems that arose during the research that led to the present invention. According to this particular technique, prior to shaping, the metal wires are covered with a layer of a keromorphous substance, i.e., which has the physical and morphological properties of a wax. Besides wax, paraffins, esters and fatty acids used to make candles and some polymers having characteristics sufficiently close to wax for facilitating the coating of metal wires can be cited as examples of keromorphous substances. This operation is generally carried out by immersion in a bath of the keromorphous substance at a temperature above its melting or softening point. The thickness of the layer of keromorphous substance is advantageously between 2% of the diameter of the wire and 0.5 mm.

This keromorphous substance runs the risk of adversely affecting the quality of sintering or of the bond obtained by heating at high temperature; therefore, it should be progressively eliminated by allowing these degradation products to escape through the pores of the material or the receptacle prior to baking. This elimination stage consists of a progressive heating to a temperature less than 500° C. and advantageously to a temperature between ca. 100° C. and up to ca. 300° C. to obtain a pyrolysis of the keromorphous substance. This temperature rise can be effected by stages or progressively and generally has a duration of 1–3 hours.

The present invention is particularly well suited for molding processes of metals and alloys, whose tapping temperature does not exceed 1600° C.

In the present description, the expressions "ca.", "in the vicinity of" and "of the order of" stress that the numerical values given correspond to mathematical rounding and that the zeros do not constitute significant figures, but correspond simply to arithmetic of position.

A following non-limiting example will inform the technician on how best to implement the present invention and to better understand its interest.

EXAMPLE

A removal "ladle" was produced according to the technique of the present invention. The metal frame was of stainless steel wire of the grade 310, 0.6 mm in diameter and with a mesh of 12.5 in simple welded braiding.

Figure 1:
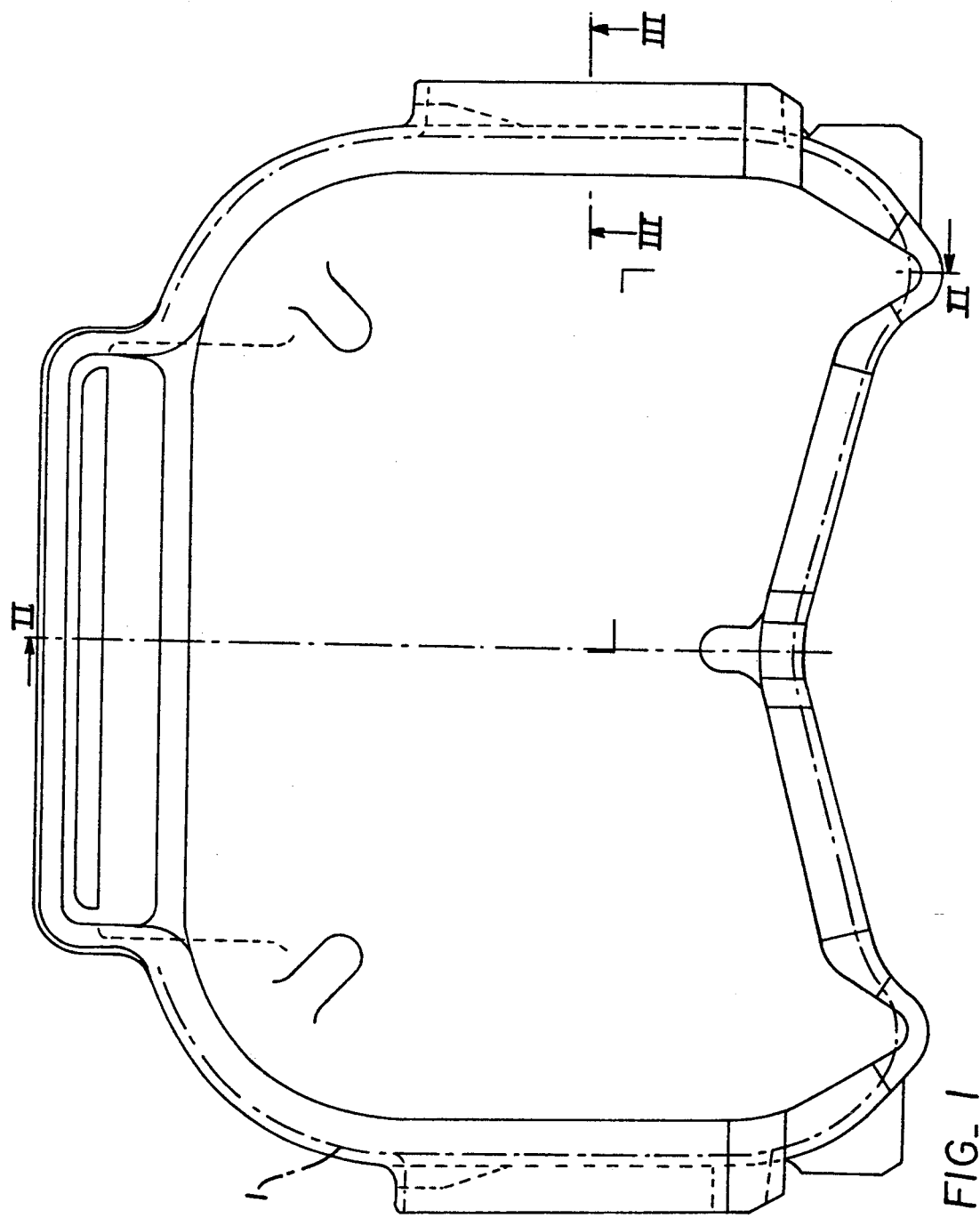
FIG. 1 shows the ladle or spoon in top view.
Figure 2:
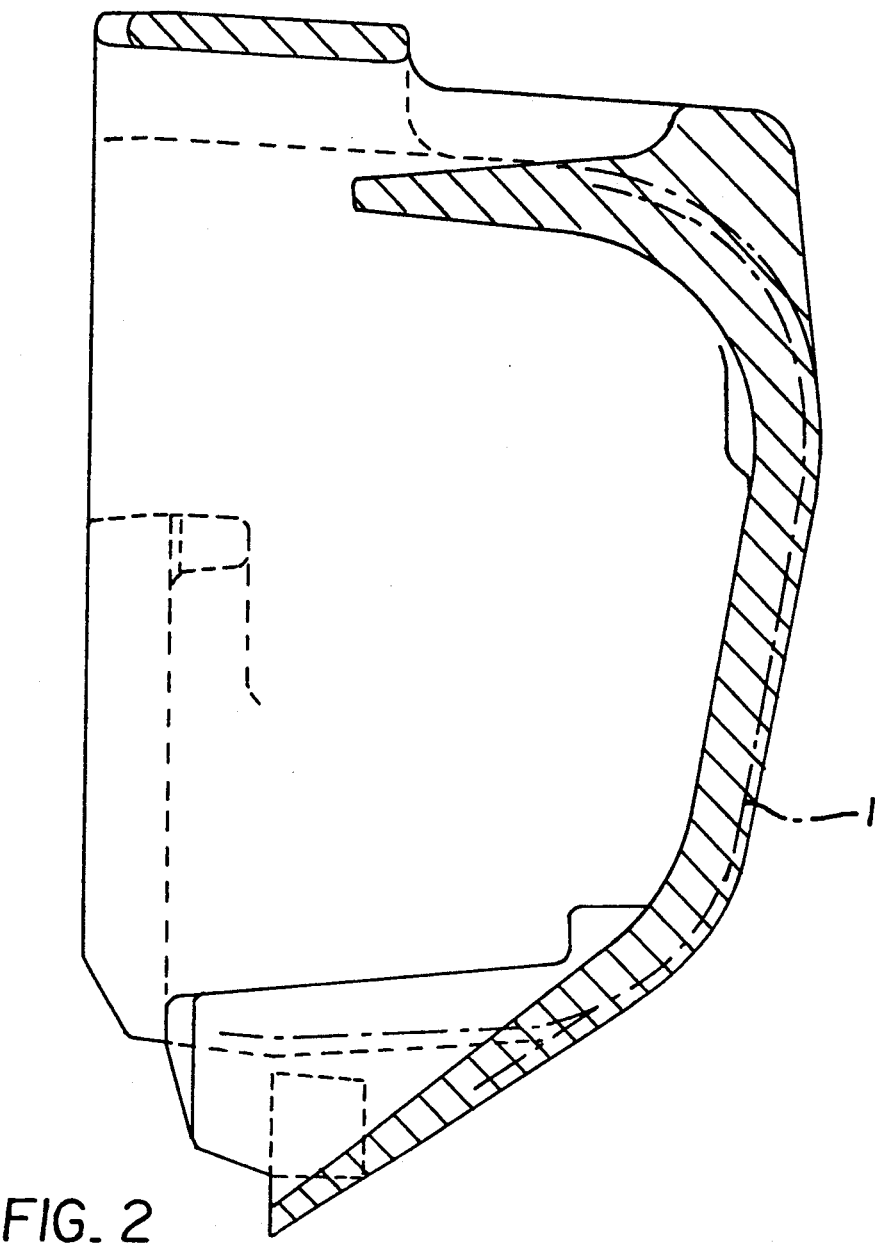
FIG. 2 shows a cut along II—II.
Figure 3:
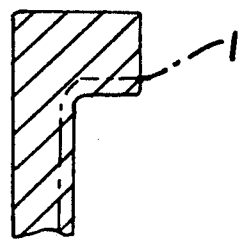
FIG. 3 is a partial section along III—III.

The metal network embedded in vitreous silica is designated by the reference number 1, the shape of such a ladle is known in itself and it is unnecessary to encumber the application by detailing its description. The piece was produced by placing the metal network in the mold and then casting a mixture with 18% water into the said mold of plaster of Paris.

Once the piece is dry, it was subjected to a progressive heating to 150° C. and was left at this temperature for 4 days. The temperature of the piece was then progressively brought to 1000° C., the temperature rise being spread over 2 days. Once the temperature of 1000° C. was attained, the piece was held at this temperature for some 20 hours. The cooling then proceeded slowly according to conventional procedures (at least about one day for the cooling).

The cast mixture consisted of a slip composed of more that 95% vitreous silica with a granulometry of $d_{80}<1$ $\mu$ and of a charge composed of more than 80% vitreous silica with a granulometry $<300$ $\mu$ and nodular alumina. The vitreous silica is that sold under the trade name Glasrock, whose technical characteristics are given in the following Table:

TABLE I
GENERAL CHARACTERISTICS

| | |
|---|---|
| Chemical analysis: SiO$_2$ | 99.5% |
| Mineralogical composition | |
| Crystalline phases | 2% |
| Physical properties | |
| Density | 1.9 Kg · dm$^{-3}$ |
| Open porosity | 12% |
| Coefficient of expansion | 0.6 10$^{-6}$°C.$^{-1}$ |
| Modulus of rupture by bending | 12 N · mm$^{-2}$ |
| Thermal conductivity | |
| 260° C. | 0.36 Kcal · h$^{-1}$ · m$^{-1}$ · °C.$^{-1}$ |
| 540° C. | 0.51 |
| 824° C. | 0.64 |
| 1090° C. | 0.88 |

We claim:

1. A transportable metallurgical vessel for holding and transferring molten metal from a furnace to a remote casting location, said vessel having no outer metal containment shell and further comprising a self-supporting monolithic shape of a refractory material containing at least 50% vitreous fused silica, having a network of wires embedded within said shape and spaced from outer surface portions of the shape to provide increased mechanical strength and minimize thermal conductivity through said monolithic refractory shape.

2. The transportable metallurgical vessel of claim 1 wherein the wires are of a mineral refractory material having a diameter between about 0.05 and 5 mm.

3. The transportable metallurgical vessel of claim 2 wherein the mineral refractory material of the wires is silicon carbide.

4. The transportable metallurgical vessel of claim 1 wherein the wires are metal wires having a diameter between about 0.1 mm and 1 mm.

5. The transportable metallurgical vessel of claim 4 wherein the metal wires are stainless steel.

6. Process for making a transportable metallurgical vessel having no outer metal containment shell comprising the steps of:
   providing a refractory mix consisting of at least 50% by weight fused silica;
   providing a mold in the shape of a metallurgical vessel;
   providing a network of wires and placing said network of wires in said mold;
   casting said refractory mix into said mold to form a monolithic refractory shape whereby said network of wires is embedded in and spaced from surface portions of said monolithic refractory shape; and
   drying and baking to form a self-supporting monolithic refractory shape.

7. The process of claim 6 wherein the network of wires is metal which is coated with a keromorphous substance prior to placing said network in the mold, said process further including the step of heating the cast refractory between about 100° C. to less than 500° C. to cause pyrolysis of the keromorphous substance prior to said baking step.

8. The process of claim 7 wherein the metal wires are stainless steel.

9. The process of claim 6 wherein the network of wires is provided from a mineral refractory material.

10. The process of claim 9 wherein the mineral refractory material is silicon carbide.

* * * * *

UNITED STATES PATENT AND TRADEMARK OFFICE
CERTIFICATE OF CORRECTION

PATENT NO. : 5,318,279

DATED : June 7, 1994

INVENTOR(S) : Gilbert Brandy, Jean-Claude Compagnon and Jean-Marie Vignot

It is certified that error appears in the above-indentified patent and that said Letters Patent is hereby corrected as shown below:

Column 3 Line 16 "oxides" (third occurrence) should read --oxide--.

Column 3 Line 60 "fixed" should read --fused--.

Column 3 Line 67 "Water" should read --water--.

Column 5 Line 23 "that" should read --than--.

Claim 2 Line 10 Column 6 after "0.05" insert --mm--.

Signed and Sealed this

Thirteenth Day of September, 1994

Attest:

BRUCE LEHMAN

Attesting Officer

Commissioner of Patents and Trademarks